UNITED STATES PATENT OFFICE.

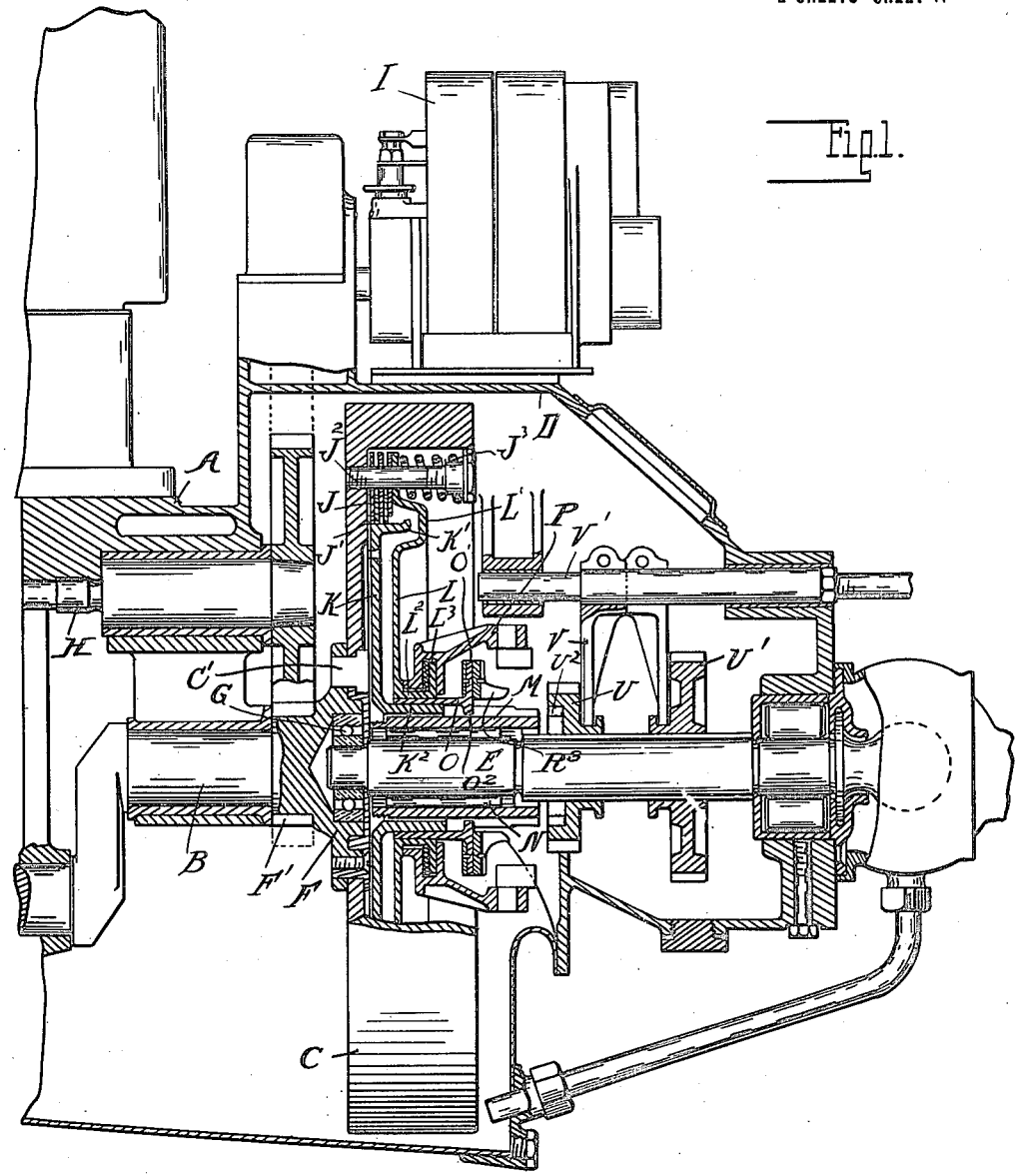

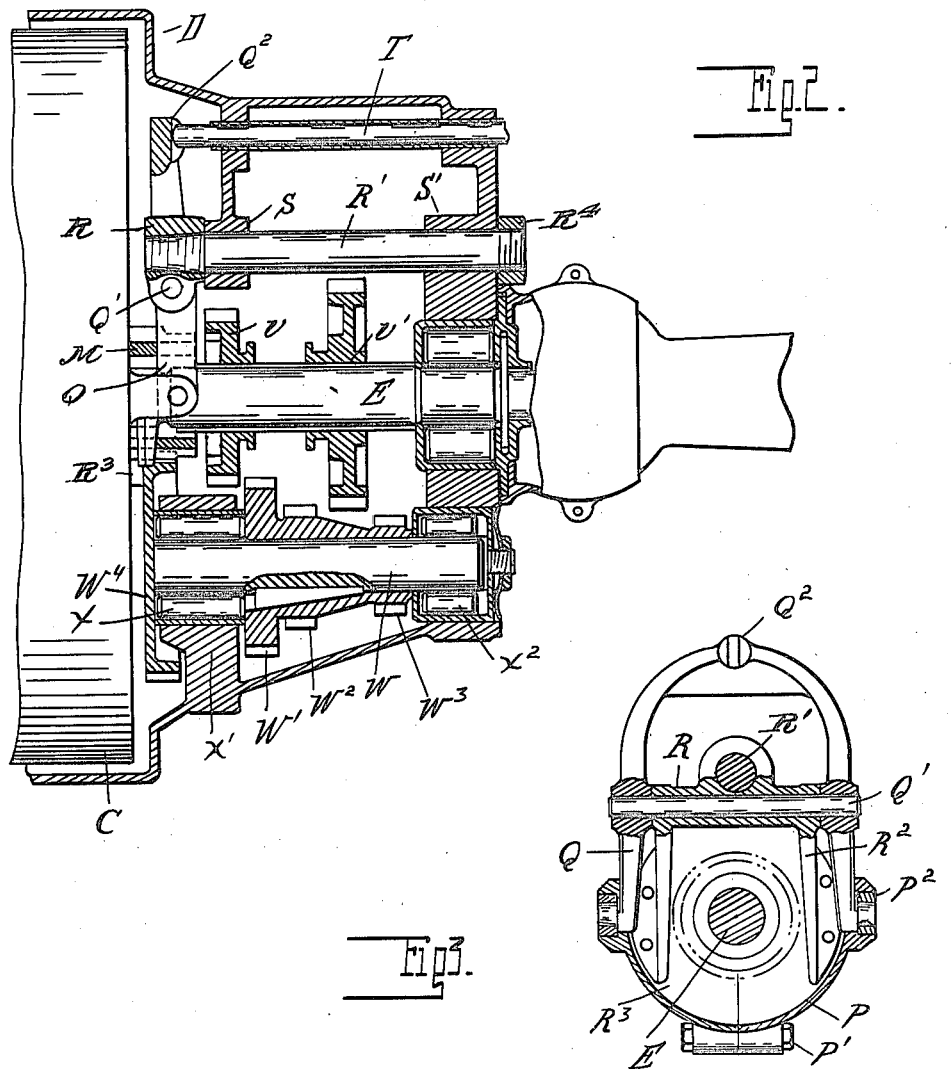

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

POWER-TRANSMISSION MECHANISM.

1,163,844.     Specification of Letters Patent.     Patented Dec. 14, 1915.

Application filed February 14, 1912. Serial No. 677,599.

*To all whom it may concern:*

Be it known that I, EMIL A. NELSON, a citizen of the United States of America, residing at Detroit, in the county of Wayne and State of Michigan, have invented certain new and useful Improvements in Power-Transmission Mechanism, of which the following is a specification, reference being had therein to the accompanying drawings.

The invention relates to power transmission mechanisms being particularly designed for use in motor vehicles.

It is the primary object of the invention to obtain a compact arrangement of mechanism and one in which the longitudinal dimension is reduced to the minimum.

It is a further object to simplify the construction and with these objects in view the invention consists in the construction as hereinafter set forth.

In the drawings,—Figure 1 is a vertical section through a device embodying my invention in the plane of the crank shaft; Fig. 2 is a horizontal section through the transmission gearing in the plane of the transmission shaft; and Fig. 3 is a view partly in section of the brake mechanism.

A is the engine crank case, B is the crank shaft journaled therein, C is the fly wheel at the end of the crank shaft and beyond which the transmission gearing is located. The housing for all of these parts is preferably formed integral with the crank case A and as shown an enlarged portion D of said case forms the housing for the fly wheel and the transmission gearing.

To reduce the length of the mechanism the main clutch is arranged within the fly wheel and is operated by mechanism extending but slightly beyond the plane of the fly wheel. Thus the variable speed gearing is in close proximity to the fly wheel and the whole structure is shortened.

In detail E is the transmission shaft which is stepped into the end of the engine crank shaft B and is provided with an antifriction ball bearing therein. To this end the crank shaft is provided with a flanged enlargement F recessed for the ball bearing G and having the fly wheel C secured to its flange by bolts C'. The enlarged portion F of the crank shaft is cut to form a sprocket or gear F' which is utilized for driving the valve cam shaft H and may also drive a magneto I mounted on the top of the fly wheel housing. Thus by forming the sprocket wheel F' and flanged enlargement F integral with the crank shaft these parts are condensed in length to a much greater extent than would be possible if separately made.

The main clutch of the transmission is preferably of the disk type and consists of the alternately arranged parallel annular disk members J and J', the former being anchored to the fly wheel by bolts or studs $J^2$ and the latter being keyed to a disk member K having a peripheral flange K'. There is also a clamping plate member L which is anchored by the bolts or studs $J^2$ to rotate with the fly wheel and has the annular bend L' therein providing clearance for the flange K' of the member K. These members K and L are preferably sheet metal stampings, and each is provided with a central hub portion, which portions are concentrically arranged one about the other.

M is a pinion member which surrounds the driven shaft E and preferably is rotatively mounted thereon by the roller bearing N. A portion of the teeth of this pinion member M are cut-away to receive the hub $K^2$ of the member K, which hub is fluted to engage the remaining portion of the teeth, thereby keying the member K to the pinion.

O is a member sleeved about the hub portion $K^2$ and intermediate the same and the hub portion $L^2$ of the member L. This member O is provided with an outwardly extending flange O' and with one or more inwardly extending lugs $O^2$ for engaging the grooves between the teeth of the pinion M to be rotatively connected therewith, while permitting an independently longitudinal sliding movement. The hub member $L^2$ is provided at its outer end with an outwardly extending flange $L^3$ parallel to the flange O', which flange $L^3$ is engaged by a shifting mechanism of the following construction: P is a grooved collar member embracing the flange $L^3$ of the member L on both sides thereof and being formed in two sections secured together by bolts P', which permits of assembling the parts. The collar member P is provided with ears $P^2$ which are pivotally engaged by the ends of a bifurcated lever Q. This lever is fulcrumed upon a pin or shaft Q' which engages an alined aperture in a member R mounted upon the end of a rod or shaft R' secured in bearings S and S' in the housing for the transmission gearing. The furcations of the lever Q unite at their outer ends and form a bearing Q² which is engaged by a push rod T also mounted in the bearings S and S' and extending out from the transmission housing. Thus the member R and shaft Q' form a fulcrum for the lever Q so that when the latter is actuated by the push rod T engaging the bearing Q² the inner ends of the furcations will shift the grooved collar P, thereby also shifting the member L through the medium of its flange L³. The member L constitutes the clamping member for the clutch and is yieldably pressed against the disk member J and J' by the tension of springs J³ sleeved upon the studs J², the arrangement being such that the tension for engaging the clutch is furnished by the springs J³ and the pressure is released by a movement of the member L against the tension of said springs when actuated by the lever Q, collar P and flange L³.

The member R is provided with inwardly extending arms R² which support an annular member R³ arranged parallel to the flanges L³ and O' but separated therefrom sufficiently to provide for the normal range of adjustment of the member L. When however, the member L is retracted to its limit the collar P will bear against the flange O' of the member O and will press the latter against the annular member R³ with the result that the latter member being non-rotative will act as a brake shoe for arresting the rotation of the flange O'. As the member O is keyed to the pinion M by the lugs O², and as the member K is also keyed to said pinion by the engagement of its fluted hub with the stubs of the cut-away teeth, it is evident that the braking of the flange O' will arrest rotary movement of both the pinion M and the member K.

The construction above-described is one which reduces the longitudinal dimension of the clutch and its actuating mechanism to the minimum; first, by arranging the shifting lever Q and its fulcrum member R in the same plane; second, by the concentric arrangement of the hub members L² and K² and the intermediate sleeve member O; and third, by the annular bead or struck out portion L' in the member L which provides clearance for the flange K' and permits of placing the members L and K closer to each other. These various features combined with each other, as well as where used in connection with the novel construction of the member F for attaching the fly wheel, produces an exceedingly compact arrangement of parts with the minimum longitudinal dimension.

The fulcrum member R and the brake shoe R³ carried thereby, may be adjusted in relation to the other members of the mechanism by the longitudinal adjustment of the rod or shaft R', which latter is threaded at its outer end and is engaged by an adjusting nut R⁴ for shifting it longitudinally.

The variable speed gearing is arranged adjacent to the clutch mechanism just described and comprises shiftable gear wheels U and U' feathered upon the shaft E and operated by forks V upon shifting rods V'. There is also provided a counter shaft W parallel to the shaft E upon which is mounted the three differential gears W', W² and W³. The first of these is engageable with the pinion U in one of the positions of adjustment of the latter, said pinion also having an internal gear U² for clutching on to the pinion M in the opposite position of adjustment. The gear wheel U' is engageable with the gear wheel W² and a space is provided between the gear wheels W² and W³ for the gear wheel U' when out of mesh. The gear wheel W³ is used in connection with the gear wheel U' and a reversing pinion (not shown) to produce the reverse drive. In addition to the pinions W', W² and W³ the shaft W has secured thereto, a gear wheel W⁴ which is in constant mesh with the pinion M so that whenever rotary movement is imparted to the latter the shaft W and all of the gears W', W² and W³ will be driven. Differential movement is then communicated to the driven shaft E by a shifting of the gear wheels U and U' or by throwing the gear wheel U into mesh with the pinion M, the shaft E is driven at engine speed.

By reason of the condensed construction there is not sufficient space for all of the pinions W', W², W³ and W⁴ together with suitable bearings for the shaft W. An additional length of bearing is obtained by extending it beneath the flange of the gear wheel W⁴ and in close proximity to the web of said wheel. This bearing X is preferably a roller bearing mounted in a stationary bearing X' formed integral with the housing and a similar bearing X² is arranged at the opposite end of the shaft.

What I claim as my invention is:

1. In a clutch, a driven member formed of a sheet metal stamping having a fluted hub, means for driving said member, and a pinion engaging the flutes of said hub and secured thereto.

2. In a clutch, a driven member formed of a sheet metal stamping having a fluted hub, means for driving said member, a pinion having a portion of its teeth cut-away to form a shield for the end of said hub, the remaining portions of the cut-away teeth engaging the flutes of the hub.

3. In a clutch, a driven member formed of a sheet metal stamping having a fluted hub, means for driving said member, a pinion having a portion of its teeth cut-away to receive said fluted hub, the stubs of the teeth engaging the flutes, a sleeve surrounding said hub longitudinally slidable thereon and having an outwardly extending flange, and an inwardly extending lug or key for engaging a groove between adjacent teeth, a clamping member having a hub revolubly sleeved upon the last mentioned member and provided with an outwardly extending flange, a non-revoluble collar embracing said flange, a non-revoluble annular member adjacent to the first mentioned flange, and means for adjusting said collar to release said clamping member and to clamp the flange on the intermediate sleeve member between said collar and said non-revoluble annular member.

4. In a clutch, a pinion, a driven member having a hub portion sleeved upon said pinion and secured thereto, a clamping member for said driven member for actuating the latter, having an actuating flange surrounding said hub, a collar engaging said flange for releasing said clamping member, a non-revoluble annular member parallel to said collar and spaced therefrom, a member longitudinally adjustably sleeved upon said driven member intermediate the same and the flange of said clamping member and provided with a lug or key for engagement with the teeth of said pinion, and an outwardly extending flange intermediate said collar and annular non-revoluble member, and means for adjusting said collar to release said clamping member and to clamp the flange of said intermediate member between said collar and said non-revoluble annular member.

5. In a clutch, the combination with a driven member and the clamping member for driving the first-mentioned member, of an adjustable collar for releasing said clamping member, an annular non-revoluble member parallel with said collar and spaced therefrom, and a flange revoluble with said driven member and longitudinally adjustable in relation thereto, extending intermediate said collar and non-revoluble annular member and clamped therebetween in the released position of the clutch to form a brake for retarding said driven member.

6. In a clutch, the combination with a driven member and a clamping member for actuating the driven member, of a flange on said clamping member, a grooved collar engaging said flange, a non-revoluble annular member parallel to said collar and flange, a flange revoluble with said driven member and independently longitudinally adjustably arranged between said collar and non-revoluble annular member and clamped thereby in the released position of the clutch.

7. In a clutch, the combination with a driven member provided with a hub, a revolving clamping member for actuating the driven member, having a hub surrounding the hub of said driven member and provided with an outwardly extending flange, a grooved collar engaging said flange, a non-revoluble annular member parallel with said grooved collar and flange, a member sleeved between the hub and said driven member and clamping member revoluble with the former and independently longitudinally adjustable, said sleeve member having an outwardly extending flange between said collar and non-revoluble annular member and clamped thereby in the released position of the clutch.

8. A clutch, comprising a disk-shaped drive member, a series of annular alternately arranged drive and driven disks, a stud for connecting said drive disks with said drive member, a comparatively flat disk-shaped driven member having an outwardly extending peripheral flange for coupling the same with said driven disks, and a comparatively flat disk-shaped clamping member having an annular groove for providing clearance for said peripheral flange.

9. The combination with a fly wheel, of a clutch therein comprising a series of annular alternately arranged drive and driven disks, a comparatively flat driven member formed of a sheet metal stamping having an outwardly extending peripheral flange for coupling the same with said driven disks, a comparatively flat clamping member also formed of a sheet metal stamp arranged parallel with said driven member and having an annular grooved bead formed therein for providing clearance for said peripheral flange.

10. The combination with a fly wheel having an overhanging peripheral flange, of an axially arranged driven pinion within said fly wheel, and a clutch comprising a driven member formed of a sheet metal stamping having a fluted hub for engaging the teeth of said pinion and also having an outwardly extending disk-shaped portion parallel with and adjacent to the hub of said fly wheel and an outwardly extending peripheral flange, a series of drive and driven friction disks between said peripheral flange on the clutch driven member and the rim of the fly wheel, a clutch clamping member formed of a sheet metal stamping having a hub portion sleeved upon the hub of said driven member with an outwardly extending actuating flange, the body portion of said clamping member being parallel to said driven member and web of the fly wheel and having a grooved bead for providing clearance for the peripheral flange of said driven member.

11. In a clutch, the combination with a clamping member, of a non-revoluble actuating collar therefor, a bifurcated lever embracing said collar and pivotally engaging the same, a fulcrum for said lever intermediate the furcations thereof, a non-revoluble annular member parallel with said collar mounted on said fulcrum, and a driven member having a flange arranged between said collar and non-revoluble annular member and clamped thereby to form a brake, said driven member being actuated through said clamping member.

12. The combination with a fly wheel and an axially alined driven shaft, of a housing inclosing said members, a clutch within said fly wheel comprising a clamping member, a collar for actuating said clamping member, a bifurcated lever embracing said driven shaft and pivotally engaging said collar, a push rod for actuating said lever slidably mounted in said housing, a fulcrum for said lever arranged intermediate the furcations thereof, a rod on which said fulcrum is mounted extending longitudinally of said housing and adjustable from outside thereof.

13. In a clutch, a driven member having a fluted hub, means for driving said member, a pinion engaging the flutes of the hub, and a shiftable member adapted to be coupled to said pinion.

14. The combination with an engine crank shaft, of an axially alined transmission shaft, a fly-wheel secured to said crank shaft, a pinion revolubly mounted upon said transmission shaft within said fly-wheel, a clutch within said fly-wheel having its driven member secured to said pinion, and a clamping member sleeved thereabout and connected to said fly-wheel, and actuating mechanism for the last-mentioned member.

15. A clutch comprising alternately arranged driving and driven disks, a driven member to which said driven disks are keyed formed of a sheet metal stamping and having a fluted hub, a pinion engaging said hub, a clamping member revolubly sleeved upon said fluted hub, and actuating means for said clamping member.

In testimony whereof I affix my signature in presence of two witnesses.

EMIL A. NELSON.

Witnesses:
FRANK E. WATTS,
GRANVILLE C. ALDRICH.